(12) United States Patent
Cartier

(10) Patent No.: US 9,908,261 B2
(45) Date of Patent: Mar. 6, 2018

(54) MIXER, METHOD OF MIXING RAW MATERIAL FOR POWDER METALLURGY BINDER FOR INJECTION MOULDING COMPOSITION

(71) Applicant: Comadur S.A., Le Locle (CH)

(72) Inventor: Damien Cartier, Besancon (FR)

(73) Assignee: Comadur S.A., Le Locle (CH)

( * ) Notice: Subject to any disclaimer, the term of this patent is extended or adjusted under 35 U.S.C. 154(b) by 887 days.

(21) Appl. No.: 14/268,227

(22) Filed: May 2, 2014

(65) Prior Publication Data

US 2014/0336034 A1 Nov. 13, 2014

(30) Foreign Application Priority Data

May 7, 2013 (CH) ........................................ 923/13
May 17, 2013 (CH) ........................................ 984/13

(Continued)

(51) Int. Cl.
*B01F 7/18* (2006.01)
*B01F 15/06* (2006.01)
(Continued)

(52) U.S. Cl.
CPC ............ *B28C 5/166* (2013.01); *B01F 3/1221* (2013.01); *B01F 3/14* (2013.01); *B01F 7/00* (2013.01);
(Continued)

(58) Field of Classification Search
CPC ........ C04B 35/62675; C04B 35/62685; C04B 35/62695; C04B 40/0032; B28C 7/02;
(Continued)

(56) References Cited

U.S. PATENT DOCUMENTS 2,298,317 A * 10/1942 Smith ................ B01D 19/0052
165/168
4,444,508 A * 4/1984 Kreuer .................... B01F 13/06
366/139
(Continued)

FOREIGN PATENT DOCUMENTS

CH 708039 A2 * 11/2014 .......... B01F 7/00641
EP 0 956 918 A1 11/1999
(Continued)

OTHER PUBLICATIONS

European Search Report dated Dec. 10, 2013 in EP application 13178141, filed on Jul. 26, 2013 ( with English Translation).
(Continued)

*Primary Examiner* — Charles E Cooley
(74) *Attorney, Agent, or Firm* — Oblon, McClelland, Maier & Neustadt, L.L.P.

(57) ABSTRACT

A mixer for ceramic feedstock pellets with a tank, a mixing shaft, and a heat exchanger including a cooler for the cooling of the content of this tank is provided. A controller controls the heat exchanger which includes a heater arranged to heat the content of this tank to a temperature comprised between a lower temperature (TINF) and a higher temperature (TSUP) stored in a memory for a specific mixture, and the heater exchanges energy with a heat exchange and mixing temperature maintenance circuit, external to this tank, and wherein the thermal inertia of this circuit is higher than that of this fully loaded tank. The invention also concerns a method for mixing raw material for powder metallurgy, implementing a specific injection molding composition and a specific binder.

14 Claims, 4 Drawing Sheets

(30) Foreign Application Priority Data

| | | |
|---|---|---|
| May 28, 2013 | (CH) | 1021/13 |
| Jul. 15, 2013 | (EP) | 13176532 |
| Jul. 26, 2013 | (EP) | 13178141 |

(51) Int. Cl.

| | |
|---|---|
| *B28C 5/16* | (2006.01) |
| *B01F 7/00* | (2006.01) |
| *B01F 15/00* | (2006.01) |
| *B01F 15/02* | (2006.01) |
| *B01F 3/12* | (2006.01) |
| *B01F 3/14* | (2006.01) |
| *C04B 35/10* | (2006.01) |
| *C04B 35/48* | (2006.01) |
| *C04B 35/56* | (2006.01) |
| *C04B 35/584* | (2006.01) |
| *C04B 35/626* | (2006.01) |
| *C04B 35/632* | (2006.01) |
| *C04B 35/634* | (2006.01) |
| *B28C 5/46* | (2006.01) |
| *B28C 7/02* | (2006.01) |
| *B01F 7/20* | (2006.01) |
| *B28B 3/22* | (2006.01) |

(52) U.S. Cl.
CPC ............ *B01F 7/00641* (2013.01); *B01F 7/18* (2013.01); *B01F 7/20* (2013.01); *B01F 15/00175* (2013.01); *B01F 15/00201* (2013.01); *B01F 15/00253* (2013.01); *B01F 15/00389* (2013.01); *B01F 15/00396* (2013.01); *B01F 15/0289* (2013.01); *B01F 15/065* (2013.01); *B28B 3/226* (2013.01); *B28C 5/466* (2013.01); *B28C 5/468* (2013.01); *B28C 7/02* (2013.01); *C04B 35/10* (2013.01); *C04B 35/48* (2013.01); *C04B 35/5607* (2013.01); *C04B 35/5611* (2013.01); *C04B 35/5626* (2013.01); *C04B 35/584* (2013.01); *C04B 35/62675* (2013.01); *C04B 35/62685* (2013.01); *C04B 35/62695* (2013.01); *C04B 35/632* (2013.01); *C04B 35/63408* (2013.01); *C04B 35/63416* (2013.01); *C04B 35/63424* (2013.01); *C04B 35/63428* (2013.01); *C04B 35/63492* (2013.01); *B01F 2015/061* (2013.01); *B01F 2015/062* (2013.01); *C04B 2235/6022* (2013.01)

(58) Field of Classification Search
CPC ......... B28C 5/468; B28C 5/466; B28C 5/166; B01F 7/00; B01F 15/00389; B01F 15/0289; B01F 15/065; B01F 3/1221; B01F 15/00175; B01F 15/00396
USPC ........................................................ 366/145
See application file for complete search history.

(56) References Cited

U.S. PATENT DOCUMENTS

| | | | | |
|---|---|---|---|---|
| 4,958,934 | A * | 9/1990 | Saito | B01J 6/005 210/179 |
| 5,254,613 | A | 10/1993 | Bayer et al. | |
| 5,266,264 | A | 11/1993 | Miura et al. | |
| 5,403,088 | A * | 4/1995 | Killmer | B01F 3/04453 366/102 |
| 6,234,660 | B1 * | 5/2001 | Hullmann | B01F 5/26 366/144 |
| 6,376,585 | B1 | 4/2002 | Schofalvi et al. | |
| 2003/0170137 | A1 | 9/2003 | Yeo et al. | |
| 2003/0220424 | A1 | 11/2003 | Schofalvi et al. | |
| 2004/0217524 | A1 * | 11/2004 | Morris | B22F 3/22 264/639 |
| 2009/0117218 | A1 * | 5/2009 | Niishimura | B01F 15/065 425/144 |
| 2011/0152564 | A1 | 6/2011 | Fujiwara et al. | |
| 2014/0336034 | A1 * | 11/2014 | Cartier | B01F 7/00 501/93 |
| 2017/0203469 | A1 * | 7/2017 | Cartier | B28C 5/166 |

FOREIGN PATENT DOCUMENTS

| | | | | |
|---|---|---|---|---|
| EP | 1 344 593 | A2 | 9/2003 | |
| EP | 2 338 590 | A1 | 6/2011 | |
| EP | 2765123 | A1 * | 8/2014 | ........... B01F 7/00633 |
| FR | 2980983 | A1 * | 4/2013 | ............ B01F 15/065 |
| JP | 61222529 | A * | 10/1986 | ......... B01F 15/00396 |

OTHER PUBLICATIONS

European Search Report dated Feb. 11, 2014 in EP application 13176532, filed on Jul. 15, 2013 (with English Translation).
Jafar Firouzi et al. "Rheological Behaviour of Metal Powder Suspensions Under Dynamic Loading", Iranian Polymer Journal 15 (2), 2006, 8 pages.

\* cited by examiner

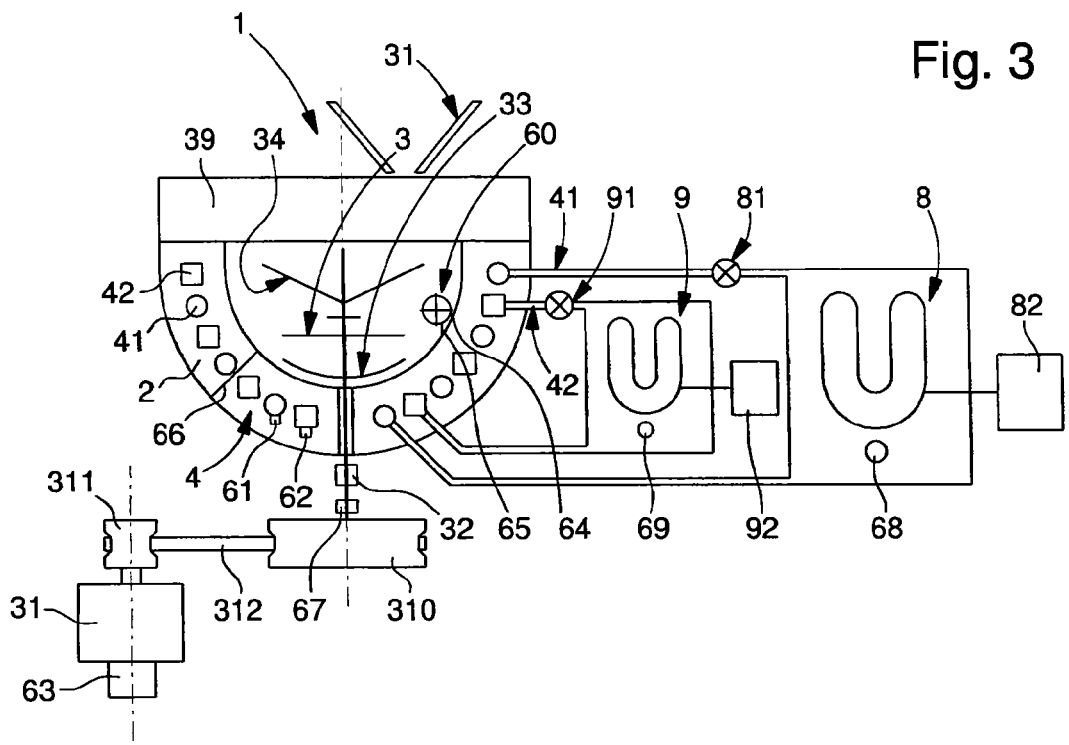
Fig. 3
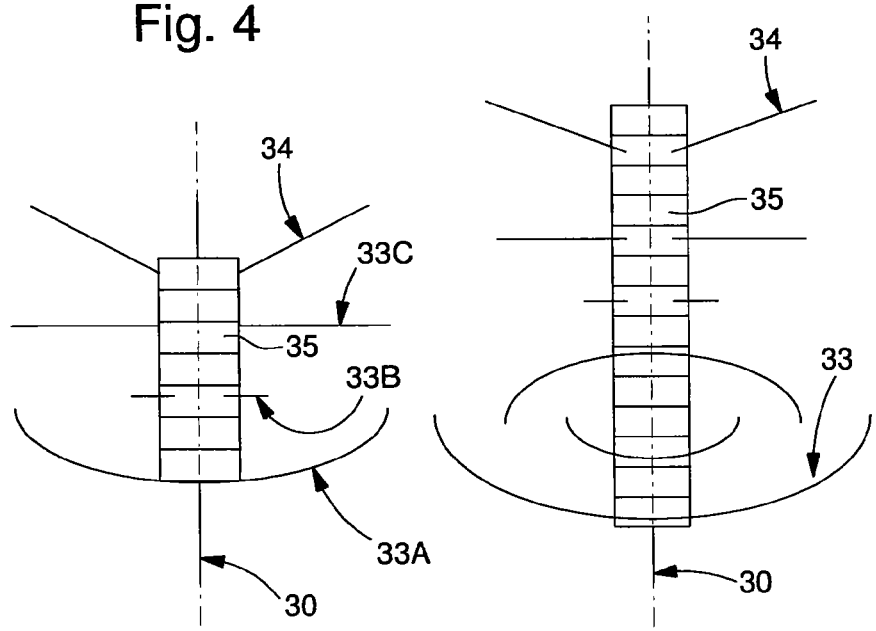
Fig. 4
Fig. 5

MIXER, METHOD OF MIXING RAW MATERIAL FOR POWDER METALLURGY BINDER FOR INJECTION MOULDING COMPOSITION

This application claims priority from Swiss Patent application No. 00923/13 filed May 7, 2013, Swiss Patent application No. 00984/13 of May 17, 2013, European patent application No. 13178141.1 of Jul. 26, 2013, Swiss Patent application No. 01021/13 of May 28, 2013 and European patent application No. 13176532.3 of Jul. 15, 2013, the entire disclosure of which is hereby incorporated herein by reference.

FIELD OF THE INVENTION

The invention concerns a mixer for manufacturing ceramic type pellets known as feedstock including, on the one hand, at least one inorganic powder of at least one oxide or cermet or metal or nitride type element or of at least one compound including at least one of said elements, and on the other hand, at least one organic binder, said mixer including at least one tank in which at least one mixing means is moveable, and including a heat exchange means.

The invention also concerns the use of a mixer of this type for manufacturing ceramic type pellets known as feedstock including, on the one hand, at least one inorganic powder of at least one oxide or cermet or metal or nitride type element or of at least one compound including at least one of said elements, and on the other hand, at least one organic binder.

The invention also concerns a binder composition for injection moulding and an injection moulding composition (feedstock) intended for the manufacture of shaped metallic or ceramic parts.

The invention also concerns a method of mixing raw material for powder metallurgy, in particular for manufacturing feedstock pellets of a given type of ceramic from a mixture including at least one inorganic powder of at least one oxide or cermet or metal or nitride type element or of at least one compound including at least one of said elements and at least one organic binder.

The invention concerns the field of powder metallurgy for obtaining ceramics, and in particular the process of mixing the mixture of raw materials to form an intermediate material known as feedstock intended to be fed to an injection press for shaping the component to be produced.

BACKGROUND OF THE INVENTION

In the manufacture of hard materials for the jewelry making and watch making industry, or for technical applications such as the medical, electronics, telephone or tooling industry, machining cutting inserts, the consumer goods industry, and particularly for hard materials generally referred to by the generic name of inorganic "ceramics", powder metallurgy techniques are used. The inorganic synthesis material obtained will be termed "ceramic" here, regardless of the nature of the material, be it sapphire, ruby, artificial diamond, sapphire glass, ceramic, micro-magnet, metal, alloy or other.

The base raw materials are of different natures, some are kept secret in order to protect productions. In a general manner, the raw materials used include at least, on the one hand ceramic powder, and on the other hand organic binders such as resins or plastic materials or similar which allow for injection and for the component created to bind correctly with the mixture of all the raw materials. Other additives may be included in the mixture. It is understood that the raw materials may be of different textures: solid, powder, liquid or a paste. The structure of the mixture may change during its creation, in particular, and not limited to, when the complementary components of a resin undergo a polymerization reaction.

The overall procedure for the manufacture of an inorganic ceramic component includes at least the following steps:
- preparing raw materials,
- mixing raw materials, or/and pre-mixing two-by-two (or more) if required,
- homogeneous mixing,
- granulating
- moulding, in particular in a moulding chamber, a quantity of powder or feedstock pellets obtained from the mixing and granulating, to create a "green" component. This moulding may be carried out by injection, under pressure, in particular in a screw injector including means for heating this quantity of powder or feedstock pellets obtained from the mixing and granulating;
- thermal debinding to burn off and/or dissolve some components of the mixture serving as binder, heat treatment of the "green" component, or sintering;
- heat treating the "green" component after debinding, for sintering to give the finished component its final consistency. This heat treatment causes dimensional shrinkage, which makes it possible to obtain a component having the final dimensions,
- surface finishing treatment of the component.

This simplified presentation of the method hides the true complexity of development that is specific to each mixture of raw materials and to each type of finished component according to its physical characteristics, particularly its resistance to wear and appearance, and according to its mechanical and chemical properties.

The performance of each step requires care and demands adherence to exact parameters, failing which irreversible alterations may be made to the characteristics of the mixture, the injected "green" component, the debinded "green" component, or the sintered component.

The homogeneous mixing step is particularly crucial for the subsequent steps of the process. This mixing step may in some cases be combined with the prior step of mixing the raw materials, which may be carried out directly in the manufacturing plant referred to here as the "mixer".

Indeed, during mixing, reactions occur between some of the raw materials, and these reactions immediately alter the physical conditions of the mixture undergoing mixing. In particular, uncontrolled and uncompensated exothermic reactions may result in a complete alteration of the mixture, which then becomes unusable for the manufacture of the intended finished component. The parameters of temperature, speed and torque must all be monitored closely. It is essential to achieve repeatability of the physical characteristics ultimately obtained, therefore the mixing must be perfectly regulated and the reactions that occur must be anticipated and controlled.

In particular, when a mixture of this type is mixed with rotating blades in a mixer, the temperature of the ingredients in the mixture rises very quickly, under the effect of friction, to exceed the melting temperature of the ingredients causing them to mix with each other in the form of a paste. The problem lies in the extremely high temperature gradient in the mixture when it approaches the melting temperature(s), with a value of around several ° C. per second, notably 10°

C. per second. It is therefore very difficult to implement effective cooling to prevent thermal runaway and deterioration of the mixture.

EP Patent Application No 2 338 590 A1, in the name of NITTO DENKO CORP, describes an apparatus and method for the production of resin with a paddle type mixer and according to a very specific arrangement, relating to the output of material at the lower end of the tank, in the form of a curved section equipped with heat exchange means using cooling to control the progressive solidification of the synthetic resin prior to crushing. The materials are melted solely by means of friction. This document is specific to polymer resins and is not intended for powder mixes, and is unsuitable for the manufacture of feedstock.

EP Patent Application No 0 956 918 A1 in the name of LOEDIGE MASCHINENBAU GmbH describes a method for manufacturing an intermediate product for injection moulding, formed by a metallic or ceramic powder and an organic binder. A mixer creates a ring of mixed material, to obtain a powder capable of being poured, and a mechanical treatment is carried out to melt the organic binder, without any heating other than the increase in temperature caused by friction between the materials.

EP Patent Application No 1 344 593 A2, in the name of ADVANCED MATERIALS TECH concerns a method for manufacturing an aluminium alloy item injection moulded from a sintered material from a mixture of at least 95% by weight of aluminium powder and oxides or additives, and describes the very specific parameters for such a mixture. It does not describe a means of heating the materials.

US Patent Application No 2004/217 524 A1, in the name of MORRIS ROBERT CRAIG, describes the manufacture of cermet feedstocks, according to specific parameters and notably with quite low temperatures, without the use of a rotating system, but with premixing in an additional tank feeding a screw extruder.

It is also an object of the invention to offer an optimised binder for injection moulding composition facilitating power metallurgy mixing to obtain ceramics or metals, in order to obtain a product of highly reproducible quality, with a controlled shrinkage coefficient.

There are already known, for example from U.S. Pat. No. 5,145,900, thermoplastic materials (feedstock) for the manufacture of moulded ceramic parts that contain a sinterable inorganic powder and a polymeric organic binder, which is essentially formed of a mixture of polyoxymethylene and of polyoxymethylene and polyoxolane copolymers.

These feedstocks were however found to have a number of drawbacks, such as, for example, insufficient fluidity for injection moulding, and problems with products retaining their moulded shapes which suffered from cracking or lamination. This was particularly the case for parts with complex shapes. They are also responsible for environmental problems caused by the necessity to use aggressive products such as nitric acid, especially in the final removal of the organic phase. Moreover, the use of water in the organic binder removal process is problematic in the event that feedstocks contain metallic materials which risk being oxidised.

SUMMARY OF THE INVENTION

This invention proposes to improve powder metallurgy mixing for the production of ceramics, in order to obtain a production output of highly reproducible quality with a controlled shrinkage coefficient, with a relative amplitude of dispersion of less than two per thousand, or even one per thousand.

The invention therefore concerns a mixer for manufacturing ceramic type pellets known as feedstock including, on the one hand, at least one inorganic powder of at least one oxide or cermet or metal or nitride type element or of at least one compound including at least one of said elements, and on the other hand, at least one organic binder, said mixer including at least one tank in which at least one mixing means is moveable, and including a heat exchange means, characterised in that said heat exchange means includes means for heating arranged to heat said tank and/or its content to a temperature comprised between a lower temperature, above which a mixture corresponding to a given type of ceramic becomes a paste, and a higher temperature below which said mixture corresponding to said given type of ceramic must be kept, said lower and said higher temperatures being stored in a memory, for said mixture corresponding to a given type of ceramic, and further characterised in that said means of heating exchanges energy, in a first connection, with a first heat exchange and mixing temperature maintenance circuit, external to said tank, and wherein the thermal inertia of said first circuit is higher than that of said tank with a full load of said mixture.

According to a feature of the invention, the heat exchange means also includes cooling means which exchanges energy, in a second connection, with a second circuit at ambient temperature, external to said tank, and whose thermal inertia is far higher than that of said tank with a full load of said mixture by a second factor.

The invention also concerns a binder for moulding composition that overcomes the aforementioned drawbacks, and more specifically aims to improve the homogeneity and the fluidity of the feedstock to allow the manufacture of metallic or ceramic parts of more complex shapes, to reduce production cycle times, to increase the mechanical resistance of the "green" and debinded bodies to production stresses (handling and various machining operations) and finally which avoids the necessity of using products that are harmful to the environment to remove the organic binder, by replacing said products with non-polluting solvents which can be eliminated by a simple heat treatment.

The invention therefore concerns a binder for injection moulding composition including:
 between 35 and 54% by volume of a polymeric base,
 between 40 and 55% by volume of a mixture of waxes,
 and approximately 10% by volume of a surfactant,
in which the polymeric base contains copolymers of ethylene and methacrylic or acrylic acid, or copolymers of ethylene and vinyl acetate, or copolymers of ethylene including maleic anhydride or a mixture of these copolymers, as well as polyethylene, polypropylene and acrylic resin.

The invention also concerns an injection moulding composition (feedstock) intended for the manufacture of shaped metallic or ceramic parts including 76 to 96% by weight of inorganic powder and 4-24% by weight of binder including:
 between 35 and 54% by volume of a polymeric base,
 between 40 and 55% by volume of a mixture of waxes,
 and approximately 10% by volume of a surfactant,
in which the polymeric base contains copolymers of ethylene and methacrylic or acrylic acid, or copolymers of ethylene and vinyl acetate, or copolymers of ethylene including maleic anhydride or a mixture of these copolymers, as well as polyethylene, polypropylene and acrylic resin.

The invention also concerns a method of mixing raw material for powder metallurgy, in particular for manufacturing feedstock pellets of a given type of ceramic from a mixture including at least one inorganic powder of at least one oxide or cermet or metal or nitride type element or of at least one compound including at least one of said elements and at least one organic binder, according to which:

said mixture is added to the mixer tank including at least one means of mixing, the temperature of said tank and its content is stabilised, by connecting heat exchange means to a first heat exchange and mixing temperature maintenance circuit, close to a mixing temperature comprised between the lower temperature above which said mixture becomes a paste, and a higher temperature below which said mixture must be kept, said mixing means is set in motion at a speed lower than or equal to 700 revolutions per minute, said mixture is mixed until a compact homogeneous mass is obtained, the high temperature stabilisation of said tank and its content for which a reduction in temperature has been authorised is stopped at a temperature higher than or equal to a temperature specific to the mixture concerned and characteristic of a compact homogeneous mass.

According to a feature of the invention, when the high temperature stabilisation of said tank and its content is stopped at a temperature higher than or equal to a specific temperature for the mixture concerned and characteristic of a compact homogeneous mass, the temperature of said tank and its content is reduced either by natural means or by the use of said heat exchange means with a negative temperature gradient, or by the connection of said heat exchange means to a second circuit at ambient temperature close to 20° C.

According to another feature of the invention, during or after said reduction in temperature, said compact mass is crushed, either in said tank at a temperature below 100° C. and a speed of said mixing means higher than or equal to 700 revolutions per minute, or in a crushing plant attached to said mixer.

BRIEF DESCRIPTION OF THE DRAWINGS

Other features and advantages of the invention will appear upon reading the following detailed description, with reference to the annexed drawings, in which:

FIG. 3 shows, in a similar manner to FIG. 2, a second variant of the mixer tank wherein the mixer tank includes two energy exchange circuits, one exchanging energy with the heating circuit of FIG. 2, and the other exchanging energy with a cooling circuit.

FIG. 4 and FIG. 5 show schematic, side views of two example mixing shafts assembled according to different compositions.

DETAILED DESCRIPTION OF PREFERRED EMBODIMENTS

Figure 1:
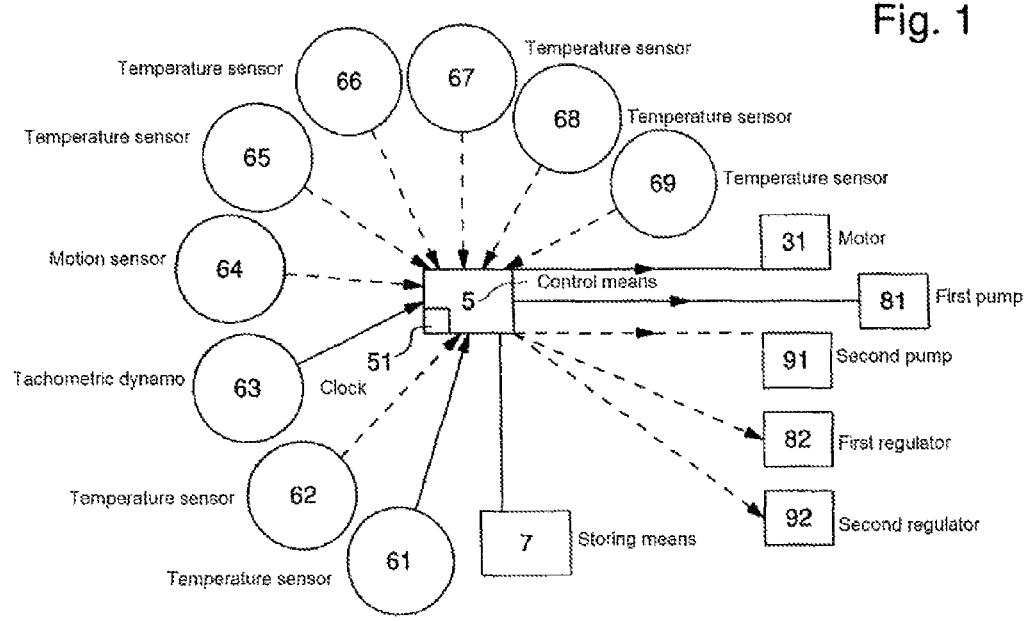
FIG. 1 shows a schematic diagram of a control system of a mixer according to the invention.

The powder referred to as ceramic more specifically employed in the scope of the invention is an inorganic powder of at least one oxide or cermet or metal or nitride type element or at least one compound of at least one of said elements.

For example, and in a non-limiting manner, this inorganic powder may include zirconia or alumina, carbides or nitrides or similar These elements or oxides are selected to ensure high hardness, high resistance to wear, high resistance to mechanical stress, and exceptional performance over time, without deterioration.

The organic binders used, resins or plastic materials or similar, make it possible to provide this inorganic powder for the pressing or injection moulding operation, with sufficient viscosity for it to be poured into the mould, whilst still offering sufficient resistant to avoid deformations.

The mixer according to the invention, for implementing the mixing procedure described below, is versatile, and these examples of powder metallurgy are not limiting of its possible uses. For example, the implementation of "MIM" (metal injection moulding) is also possible.

The object of the mixing is to coat the grains of powder with the binder or binders in such a way as to obtain a homogeneous paste This homogeneous paste becomes a compact mass after cooling when mixing is complete. This compact mass is then broken down by crushing to obtain pellets referred to as feedstock, of a homogeneous composition and calibrated dimensions, and which are in a ready-to-use state for feeding an injection press for example.

In a particular and non-limiting implementation of the invention, the mixer 1 is used to manufacture ceramic type feedstock pellets including, on the one hand, at least one such inorganic powder and on the other hand, at least one organic binder, mixer 1 includes at least one tank 2. At least one mixing means 3 is moveable in mixer 1, dipping into a corresponding tank 2 or projecting from the bottom of such a tank 2 as shown in the Figures.

Mixer 1 includes heat exchange means 4 that may include at least one circuit in which a fluid circulates in a double wall of a tank 2, or circulates in a pipe coil immersed in a tank 2, or otherwise.

Mixer 1 includes advantageously control means 5 connected to measuring means 6 and means 7 for storing in a memory the temperature parameters according to the type of material to be created.

Said control means 5 are arranged to regulate the temperature of tank 2 and the exchange of heat between tank 2 and at least one medium external to tank 2, via heat exchange means 4.

In the most simplified version, control means 5 are controlled manually, and include means for controlling the rotating speed of each mixing means 3, and the temperature and/or flow or each heat exchange circuit, according to the information displayed by measuring means 6, such as temperature probes situated in tank 2, in each heat exchange circuit, or thermometers dipped into the paste, either manually or automatically.

In a more automated production, control means 5 include at least one programmable automatic control system capable of carrying out these actions according to stored production programmes for each type of inorganic material, referred to as "ceramic", to be produced.

These control means 5 may, according to the degree of automation of the installation, in particular control heat exchange means 4, in correlation with the values of the measured shaft speed and/or compact mass flow, the measured compact mass and/or tank temperatures, and with the threshold values, in particular for the temperature, imposed by the manufacture of the given product. All of the parameters for a given product, stored in the storing means 7, advantageously make it possible to control the entire manufacturing cycle, including all the desired timings.

According to the invention, heat exchange means 4 include heating means 41, arranged to heat tank 2 and/or its content to a temperature comprised between a lower temperature TINF above which the mixture corresponding to a given type of ceramic takes the form of a paste, and a higher temperature TSUP below which the mixture corresponding to a given type of ceramic must be kept to avoid binder degradation.

This lower temperature TINF and higher temperature TSUP are stored in a memory for the mixture corresponding to a given type of ceramic, in storing means 7. In the manual version for the control of the mixer, the storing means consist of summary sheets containing the recipe of the composition loaded in the mixer, with its tolerances, including the temperature limits for each phase, and a time range for the duration of each phase.

These heating means 41 exchange energy, in a first connection, with a first heat exchange and mixing temperature maintenance circuit 8, external to tank 2. And the thermal inertia of first circuit 8 is higher than that of tank 2 with a full load of mixture. Preferably it is higher by a factor K1 greater than 2.

This thermal inertia characteristic of the heating circuit is an essential feature of the invention, as it makes it possible to obtain very short cycle times.

Heating tank 2 and its content is contrary to the assumptions of the prior art. The heating makes it possible to have less variation with respect to the average temperature and to completely control the temperature gradient. It is no longer necessary to rotate the mixing shaft at high speed to achieve the melting temperatures of the components through friction between them. The production output obtained is more homogeneous, which is of primary importance in powder metallurgy, since this means perfect control of the shrinkage coefficient during sintering, and this coefficient depends on the quality of the mixing. For example, for the manufacture of a ceramic based on raw materials such as zirconium oxide powder, $ZrO_2$, it was possible in the prior art, for a daily output of 5 batches of 20 kg each, to obtain a shrinkage coefficient within a range of between 1,2850 and 1,2920, whereas, all things being equal, it is possible, by implementing the mixer according to the invention and the associated mixing procedure, to return this coefficient to within a range of between 1,2875 and 1,2895, or respectively within a range of between 1,2880 and 1,2890, which is excellent since the relative amplitude of dispersion is then 1.6 per thousand, respectively 0.8 per thousand as opposed to 5.4 per thousand in the prior art, namely a factor of approximately 3.5, respectively 7. The production is therefore reproducible.

Figure 8:
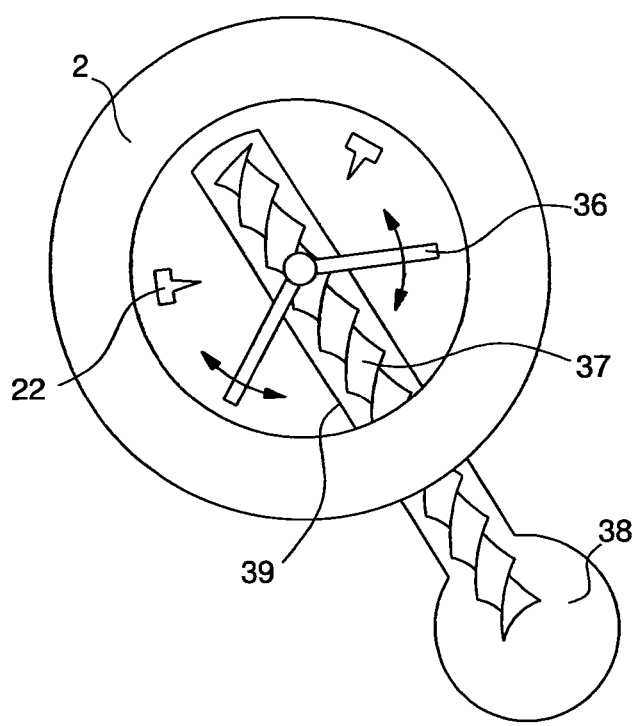
FIG. 8 shows a partial, schematic, top view (omitting the connections with the control system) of a mixer according to the invention, wherein the mixing shaft has been removed, and replaced by a set of moveable blades and vanes for crushing and fractionating a "cake", combined with a worm screw housed in a groove at the bottom of the tank.
Figure 9:
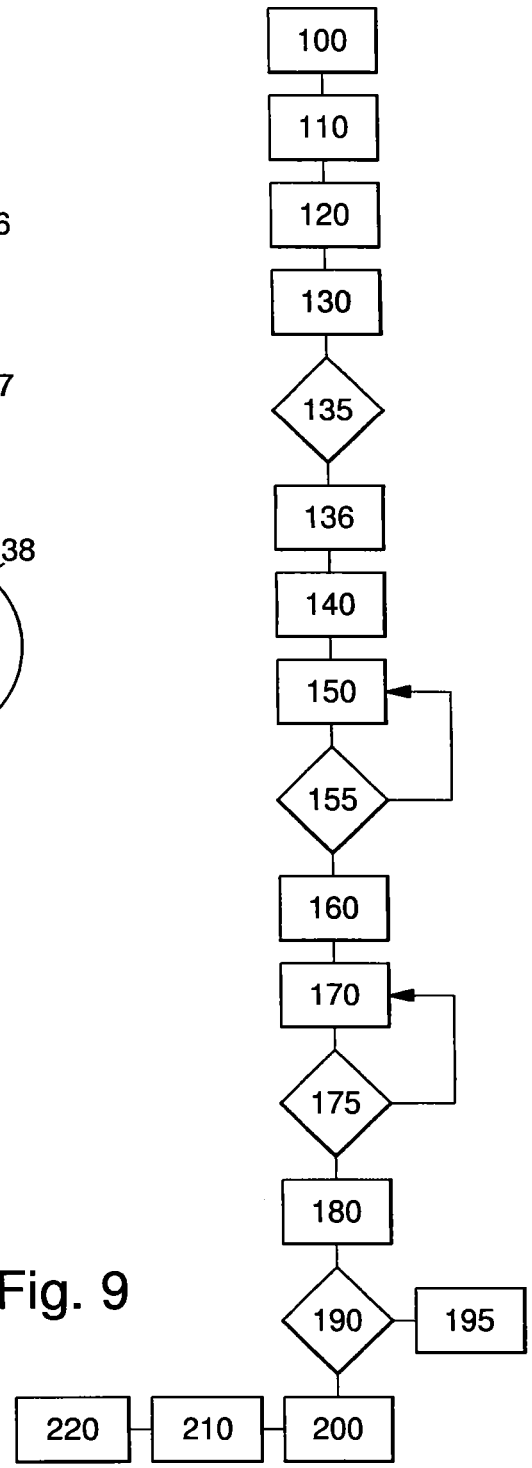
FIG. 9 shows block diagrams of a sequence of mixing processes according to the invention in a mixer according to the invention.

In a specific implementation of the invention, illustrated in FIGS. 3 and 8, heat exchange means 4 include cooling means 42 for cooling tank 2 and/or its content. These cooling means 42 are distinct from heating means 41, as shown in FIGS. 3 and 8. In this variant, cooling means 42 exchange energy, in a second connection, with a second circuit 9 at ambient temperature, external to tank 2, and whose thermal inertia is far higher than that of tank 2 with a full load of mixture, and preferentially by a second factor K2 greater than 2. In the same manner as for the heating circuit, this thermal inertia characteristic of the cooling circuit is an important feature of the invention, since it makes it possible to obtain very short cycle times.

The specific use of a heating circuit and a cooling circuit, each with far higher thermal inertia than that of the tank and its content, allows, on the one hand, control over the cycle times which may be very significantly reduced compared with prior techniques, and on the other hand, control of the thermal gradient: the temperature stabilisation ensured by heat exchange with an external circuit avoids the uncontrollable gradients of the prior art based on the use of friction to melt the binders, which were generally in excess of 10° C. per second, or higher.

The invention makes it possible to control the product at high temperatures.

The invention also ensures control of shrinkage due to the absence of any degradation of ingredients. This problem of degradation is complicated, due to the range of melting temperatures for typical binders, from 50° C. for waxes to 165 to 180° C. for paraffins or similar. It must be understood that the point of degradation and loss of properties for many ingredients is very close to the melting point. Hence a paraffin, with a melting temperature of around 180° C., is completely degraded at around 200° C., merely 20° C. above its melting point, which is clearly impossible to control with a gradient of around 10° C. per second. The same phenomenon applies to acrylic compounds. This control at high temperatures (i.e., for ceramic feedstocks for which this invention is specifically intended, between 150° C. and 200° C.) is therefore fundamental for obtaining a quality product in a reproducible manner.

In a specific implementation of the invention, control means 5 control heat exchange means 4 so as to activate the heat exchange with tank 2, at a given time, using only cooling means 42 or only heating means 41.

The use of a single heat exchange circuit in the tank alternately made to exchange heat with a heat source or a cooling source makes it possible to attain the desired temperature curve. The second embodiment with two distinct circuits, one of which may be directly connected to the tank, makes it possible for tank 2 to overcome the effects of thermal inertia, by placing it in instantaneous contact with a circuit having a far higher thermal inertia, thereby very quickly stabilising the tank within a temperature range that is conducive to smooth implementation of the process, and thus significantly reducing the overall cycle time.

Figure 2:
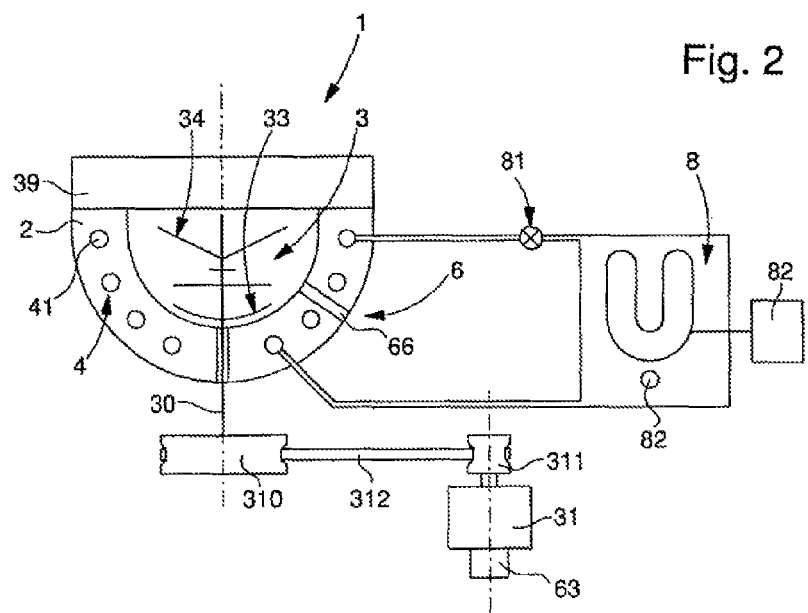
FIG. 2 shows a partial schematic diagram (with simple sketches of the connections to the control system) in a cross-section through the axis of a mixing shaft, of a mixer according to the invention according to a first variant where the mixer tank includes only one energy exchange circuit and one heating circuit.

Mixing means 3 preferably but in a non-limiting manner include a rotating shaft 30 bearing paddles 33 and/or blades inside tank 2. Each mixing shaft 30 is preferably driven, via a belt or similar, by a motor 31, fitted with a continuously variable transmission connected to control means 5 that control the variable transmission. Shaft 30 is preferably equipped with a tachometric dynamo 63 communicating the real rotating speed of shaft 30 to control means 5. FIG. 2 shows a mixing shaft 30 in a cantilever arrangement and driven underneath tank 2, which it traverses, said shaft 30 is equipped with a pulley 310 having a diameter greater than that of pulley motor 311, joined by a belt 312 or similar, in such a manner as to obtain greater torque, given that there is less need to reach high speeds of rotation than in the prior art.

FIGS. 1 to 3 show the action of control means 5, based on at least one piece of information regarding the speed of mixing means 3 or a quantity of product undergoing transformation by mixer 1, and at least one piece of information regarding the temperature of tank 2 or of the quantity of product, measured by the sensors comprised in measuring means 6, to control the speed of motor 31 directly or indirectly driving mixing shaft 30, and the rate of heat exchange, notably via a first pump 81, in first circuit 8 of heating means 41.

When, in a specific manner in the second embodiment, cooling means 42 exchange energy, in a second connection, with a second circuit 9, control means 5 also act on a second pump 91 in second circuit 9 of cooling means 42.

Control means 5 include a clock 51, making it possible to adhere to the parameters for the process entered into storing means 7.

Measuring means 6 may, specifically and in a non-limiting manner, include all or some of the following sensors:
- a temperature sensor 61 in first circuit 8 of heating means 41, preferably in tank 2 or as close as possible to the tank. In the case of the first variant that includes only heating means 41, a sensor is preferably positioned at the output of the heating system; another sensor is positioned at the input of the same circuit,
- in the case of the second variant, a temperature sensor 62 in second circuit 9 of cooling means 42, preferably in tank 2 or as close as possible to the tank,
- a tachometric dynamo 63 to measure the rotating speed of mixing shaft 30,
- a motion sensor 64 characterizing the movement of the paste in the tank, notably a rotational speed sensor for a worm screw or toothed wheel freely mounted on an axle at the bottom of the tank or similar,
- a temperature sensor 65 inside the mixture or the paste, notably connected to motion sensor 64 above,
- at least one (preferably two) temperature probes 66 on one inner surface of tank 2, preferably just flush with the inner surface of tank 2, preferably close to the bottom of the tank,
- a temperature sensor 67 of mixing shaft 30, preferably towards the end of the shaft near to the bottom of tank 2,
- a temperature sensor 68 in a large tank of first exchange circuit 8,
- a temperature sensor 69 in a large tank of second exchange circuit 9.

Control means 5 may also act on a first regulator 82 adding (or removing) heat to first circuit 8 and/or act on a second regulator 92 removing (or adding) heat from second circuit 9, these first 82 and second 92 regulators may include a heating element and/or cooling unit. Preferably, first circuit 8 conveys oil, whilst second circuit 9 conveys a mixture of water and anti-freeze or similar.

In a specific embodiment, the mixer 1 includes several tanks 2 equipped in this manner, connected to each other from an upstream tank into which the raw materials are poured by a feeder 21 such as a hopper or similar, to a downstream tank serving notably for the final crushing of the compact mixed mass. This downstream tank may also serve a double function as mixing tank and crushing tank: the raw materials for mixing are poured into it from the upstream tank, at least one mixing shaft carries out the actual mixing using paddles and/or blades of an appropriate shape to stir the paste-like mass in the mixing tank and to cut and separate it, the final crushing may be carried out, according to the case, by a mixing shaft 30 of this type, or by at least one crushing shaft equipped with blades 22 that are better suited to fragmenting a compact solidified mass. If necessary an additional crusher may be used downstream to achieve the desired particle size.

The figures show the non-limiting case of a single tank 2, in which the mixing process is carried out, from the introduction of raw materials to the crushing of the cooled mixed mass referred to as the "cake", to obtain feedstock pellets or a fine flour.

More specifically, as shown in FIG. 2, shaft 30 is vertical, and includes notably paddles 33, preferably distributed on several parallel planes.

The arrangement of the paddles and/or blades is preferably adjustable, in such a manner as to be efficient both for small loads and larger ones: either the entire mixing shaft 30 can be changed at coupling 32, or it may include a series of sockets bearing paddles or blades, supported on each other and separated where necessary by spacers 35 to obtain a specific configuration, as visible in FIGS. 3 and 4, where shaft 30 is thus equipped with three sets of lower paddles 33A, 33B, 33C, surmounted by higher paddles 34. Although the arrangement of the paddles or blades in substantially flat levels is most common, it is also possible to use paddles 34 or blades within a substantially conical envelope with respect to the axis of the shaft, especially for the top level suitable for large loads. The term "paddles" means substantially radial vanes having a shape allowing a specific movement, initially for the mixing of raw materials and then the paste. The term "blades" means vanes of similar shape with a slimmer cross section, with a sharp leading edge, notably for cutting and moving the paste-like mass, however, a sharp edge may prove to be counterproductive, as it is more prone to wear than a drive paddle for the paste, this wear causes pollution damaging the feedstock composition precision, consequently, any sharp edges require increased monitoring of the production. Advantageously, the "lower" paddles or blades, those closest to the bottom of the tank, adopt a similar shape to the tank, or are otherwise inscribed within a conic, toric or spherical surface and perform a function of scraping the paste at the bottom of the tank.

The paddles and blades are preferably offset at an angle from one set to the next; the different sets may include different numbers of paddles or blades with varying angular positions, in particular to prevent any problems of resonance and noise.

In the case of single paddles with two arms, two adjacent sets are offset at an angle of approximately 90°.

In a known manner, paddles and/or blades 33 preferably have a slight angle of incidence in relation to a plane perpendicular to the axis of shaft 30. This angle of incidence may be adjusted, either very simply by exchanging one blade set mounted on a socket as shown above, or in larger installations by using a return mechanism which is, however, more liable to wear caused by the movement of the paste. Depending on the case, the angle of incidence may be adjusted according to the direction of rotation of the shaft, either to push the compact mass to the bottom of the tank, or on the contrary to lift it: a mixed embodiment may certainly consume more power, however an upper blade set which tends to lift the paste from the bottom of the tank facilitates mixing, whilst a lower blade set which tends to force the paste towards the bottom of the tank is advantageous, particularly in the final steps of the process and for fractioning the cake obtained after the paste-like compact mass has cooled.

The cake may also be crushed, after mixing shaft 30 is cleared vertically, by the combined action of a worm screw 37 embedded in a groove 39 at the bottom of tank 2, and blades 36, articulated around a vertical axis, the crushed feedstock pellets then being removed by reversing the direction of the worm screw and conveying it to a serving station 38.

In another variant, crushing is continued until a flour is obtained. This flour is transformed downstream, in an additional granulation plant where it is first compressed to form an extruded body and cut into pellets as it advances.

Each tank 2 is preferably equipped with a closure means including at least one valve or an overpressure evacuation orifice.

The heat exchange inside the tank in which mixing is carried out makes the following possible:
  by an increase in temperature, the softening of some binders, below the highest maximum softening temperature threshold.
  a very good homogenisation of the paste, with a temperature dispersion within the paste of around +/−2 to 3° C.,
  by maintaining at a constant temperature a first heat exchange and mixing temperature maintenance circuit 8 whose thermal inertia is far higher than that of the tank with a full load, control of the thermal gradient of the compact mass in the tank at a value of less than 3° C. per minute under the friction of the components of the mixture, compared with a gradient of around 10° C. per second in prior art mixers equipped only with cooling means, this low thermal gradient obtained by the implementation of the invention allows for lower speed mixing,
  by a decrease in temperature, the maintaining of the paste temperature below a maximum threshold that is specific to the mixture defined to prevent any deterioration of its properties, in particular when exothermic reactions occur between some of the binder ingredients, and/or when the mixing speed is too high, and/or when friction in the mixture or with the paddles/blades or with the tank is too high.
  by a rapid decrease in temperature following uncoupling of the heat exchange and mixing temperature maintenance circuit, the cooling of the previously mixed compact mass in order to solidify it. This rapid decrease in temperature may be obtained by connecting heat exchange means 4 to a second ambient temperature circuit 9, whose thermal inertia is far higher than that of the fully loaded tank.

Controlling the rotational speed of at least one mixing shaft makes the following possible:
  by reducing the speed, a reduction in the friction described above,
  by reducing the speed in the final phase, a progressive setting of the compact mass until it solidifies in the form of a "cake",
  by increasing the speed, an improvement in the agglomeration of the binder ingredients around the inorganic powder of at least one oxide or cermet or metal or nitride type element or at least one compound of at least one of said elements,
  by increasing the speed, the fragmentation of the compact mass previously solidified in the form of a cake to produce feedstock pellets.

The behaviour with time of the heat exchange means and the mixing speed therefore determines the quality of the final product, in addition to the parameters specific to the intermediate product, particularly its viscosity. Correctly managing this behaviour naturally determines the cycle time in the mixer, and therefore production costs and the amortisation of the facility.

In a general manner, efforts have to be made to maintain both the temperature and the mixing speed at specific threshold limits for each mixture.

Mixer 1 may also be equipped with means for measuring the speed of motion of the compact mass inside the tank, for example on a moving part 60 such as a worm screw or an idler wheel immersed in the mass inside the tank, whose rotational speed is measured by a paste motion sensor 64, and, advantageously, the temperature inside the compact paste-like mass is measured by a paste temperature sensor 65.

The means for measuring the temperature of the compact mass may be formed, either on said moving part 60, and/or at the bottom of the tank 2 by a temperature sensor 66 on the internal surface of tank 2, and/or at the periphery of mixing shaft 30, by a temperature sensor 67, preferably on its lower portion in proximity to the bottom of tank 2.

The invention also concerns a specific binder for an injection moulding composition including:
  between 35 and 54% by volume of a polymeric base,
  between 40 and 55% by volume of a mixture of waxes,
  and approximately 10% by volume of a surfactant,
  in which the polymeric base contains copolymers of ethylene and methacrylic or acrylic acid, or copolymers of ethylene and vinyl acetate, or copolymers of ethylene including maleic anhydride or a mixture of these copolymers, as well as polyethylene, polypropylene and acrylic resin.

Preferably, the binder of the invention includes 2 to 7% by volume of one of said copolymers or their mixtures, around 25% by volume of polyethylene, 2 to 15% by volume of polypropylene and 6 to 15% by volume of acrylic resin.

According to a preferred method, the copolymer of ethylene and methacrylic acid contains 3 to 10% by weight of a methacrylic or acrylic comonomer, the copolymer of ethylene and vinyl acetate contains 7 to 18% by weight of vinyl acetate comonomer, and the copolymer of ethylene and anhydride is a random copolymer of ethylene and maleic anhydride with a melting point of 100 to 110° C. or a copolymer of HD polyethylene and a modified anhydride with a melting point of 130 to 134° C.

Preferably, the acrylic resin has a molecular weight of between 50000 and 220000 and a viscosity of between 0.21 and 0.83 and is chosen from the group including polymers of isobutyl methacrylate, methyl methacrylate, ethyl methacrylate and N-butyle methacrylate, and copolymers of isobutyl methacrylate and N-butyle methacrylate and methyl methacrylate or a mixture of these polymers and/or copolymers.

Advantageously, the wax is a Carnauba wax or paraffin wax, or palm oil, or a mixture of these elements.

According to another preferred feature, the surfactant is an N,N'-ethylene bis-stearamide or a mixture of stearic and palmitic acids (stearine), or a mixture of these elements.

The invention also concerns an injection moulding composition (feedstock) intended for the manufacture of metallic or ceramic shaped parts including 76 to 96% by weight of inorganic powder and 4 to 24% by weight of binder including:
   between 35 and 54% by volume of a polymeric base,
   between 40 and 55% by volume of a mixture of waxes,
   and approximately 10% by volume of a surfactant,
in which the polymeric base contains copolymers of ethylene and methacrylic or acrylic acid, or copolymers of ethylene and vinyl acetate, or copolymers of ethylene including maleic anhydride or a mixture of these copolymers, as well as polyethylene, polypropylene and acrylic resin.

According to a specific feature, the inorganic powder of the injection moulding composition may be chosen from the group including an oxide, nitride, carbide or metal powder or mixture of said powders and preferably the inorganic powder is chosen from the group including alumina powder, zirconium oxide powder, chromium carbide powder, titanium carbide powder or tungsten carbide powder, tungsten metal or silicon nitride powder, stainless steel powder, titanium metal powder or a mixture of these powders.

According to the preferred embodiments of the injection moulding composition, the latter contains in % by weight:
   76 to 88% of alumina and 12 to 24% of binder according to the invention as defined above, or
   76 to 88% of alumina and 0.1 to 0.6% of magnesium oxide and 12 to 24% of the binder of the invention, or
   58 to 86.5% of zirconium oxide and 3.9 to 4.6% of yttrium oxide and 0.18 to 18.5% of alumina and 9 to 22% of the binder of the invention, or
   61.5 to 84% of zirconium oxide and 3.9 to 4.6% of yttrium oxide and 0.2 to 9% of alumina and 2 to 5.5% of inorganic pigments from a list including iron oxide, cobalt oxide, chromium oxide, titanium oxide, manganese oxide, zinc oxide or a mixture of said oxides and 9 to 22% of the binder of the invention, or
   88 to 91% of chromium or titanium carbide, and 9 to 12% of the binder of the invention, or
   93 to 96% of tungsten carbide or tungsten metal and 4 to 7% of the binder of the invention, or
   78 to 85% of silicon nitride, and 15 to 22% of the binder of the invention,
This invention will now be illustrated in more detail by means of the following non-limiting examples.

Example 1

The polymeric part of the binder is mixed with a black zirconium oxide powder (such as St. Gobain Zir Black) at a temperature of around 150° C. to create a premix. To said premix are added the waxes and surfactant, and the temperature is further increased to around 180° C. to form a kind of homogeneous paste, which is then cooled and granulated until solidification, then kept to form feedstock that can be used in the manufacture of a shaped part by injection according to a known technique.

In this example 1, more specifically, 17.2 kg of zirconium powder (86% by weight) and 2.8 kg of binder (approx. 14% by weight) were used with the following volumetric composition:
   24% of HD polyethylene
   10% of polypropylene
   4% of copolymer of ethylene and methacrylic acid (with 6.5% by weight of methacrylic acid, for example a type such as "Nucrel™" from DuPont)
   10% of isobutyl methacrylate copolymer resin with a molecular weight of 195,000 (for example a type such as "Elvacite™ 2045 from Lucite International)
   1% of isobutyl methacrylate and N-butyl copolymer resin with a molecular weight of 165,000 (for example a type such as "Elvacite™ 2046" from Lucite International)
   11% of Carnauba wax
   31% of paraffin wax (for example a type such as "Carisma 54 T™" from Alpha Wax BV)
   6% of N,N'-ethylene bis-stearamide
   3% of a mix of stearic and palmitic acids (for example a type such as Stéarine Dubois).

Example 2

The same type of feedstock as in example 1 above is prepared with black zirconium oxide replaced by white zirconium oxide, and using slightly different amounts of the different components of the binder, more specifically:
   26% of HD polyethylene
   10% of polypropylene
   4% of copolymer of ethylene and methacrylic acid
   11% of "Elvacite 2045" resin
   1% of "Elvacite 2046" resin
   11% of Carnauba wax
   29% of paraffin wax
   8% of N,N'-ethylene bis-stearamide Example 3

Using the same organic binder ingredients again, with slightly different volumetric proportions, other feedstocks may be prepared with various ceramic or metallic powders, more specifically with alumina, with a shrinkage index of 1.19 or 1.30 (translucent), or chromium carbide or titanium carbide, tungsten carbide (of different qualities) and tungsten metal, according to the following table:

| Binder (% vol.) | Al$_2$O$_3$ (85-6% weight) | Al$_2$O$_3$ (transl.) (78-9% weight) | CrC (90% weight) TiC (89% weight) | CW (94-94.5% weight) | W (94-5% weight) |
|---|---|---|---|---|---|
| HD Polyethylene | 26 | 28 | 24 | 25/25 | 26/25 |
| Polypropylene | 6 | 2 | 6 | 8/8 | 10/10 |
| Copolymer ("Nucrel") | 3.5 | 3 | 3 | 4/4 | 4/4 |
| "Elvacite 2045" resin | 6 | 5 | 5 | 7/7 | 9/7 |
| "Elvacite 2046" resin | 1 | 1 | 1 | 1/1 | 1/1 |
| Carnauba wax | 12 | 12 | 12 | 11/11 | 11/11 |
| Paraffin wax | 35 | 39 | 39 | 34/37 | 29/32 |
| Bis-stereamide of N,N'-ethylene | 5.5 | 5 | 5 | 5/5 | 5/5 |
| Stéarine (Dubois) | 5 | 5 | 5 | 5/2 | 5/5 |

The method of mixing raw material for powder metallurgy, according to the invention, in particular for manufacturing feedstock pellets of a given type of ceramic from a mixture including, on the one hand, at least one inorganic powder of at least one oxide or cermet or metal or nitride type element or of at least one compound including at least one of said elements and on the other hand, at least one organic binder, is carried out including at least the following steps:
   the mixture is added to the tank 2 of a mixer 1 including at least one mixing means 3, the temperature of the tank 2 and its content is stabilised, by connecting a heat exchange means 4 to a first heat exchange and mixing temperature maintenance circuit 8, at a temperature close to the mixing temperature comprised between a lower temperature TINF specific to the mixture concerned and above which said mixture becomes a paste, and a higher temperature TSUP specific to the mixture concerned and below which said mixture must be kept, in order to prevent binder degradation, the mixing means 3 is set in motion at a speed lower than or equal to 700 revolutions per minute, the mixture is mixed until a compact homogeneous mass is obtained, the high temperature stabilisation of tank 2 and its content, for which a reduction in temperature has been authorised, is stopped at a temperature T5 higher than or equal to a temperature specific to the mixture concerned and characteristic of a compact homogeneous mass.

Figure 6:
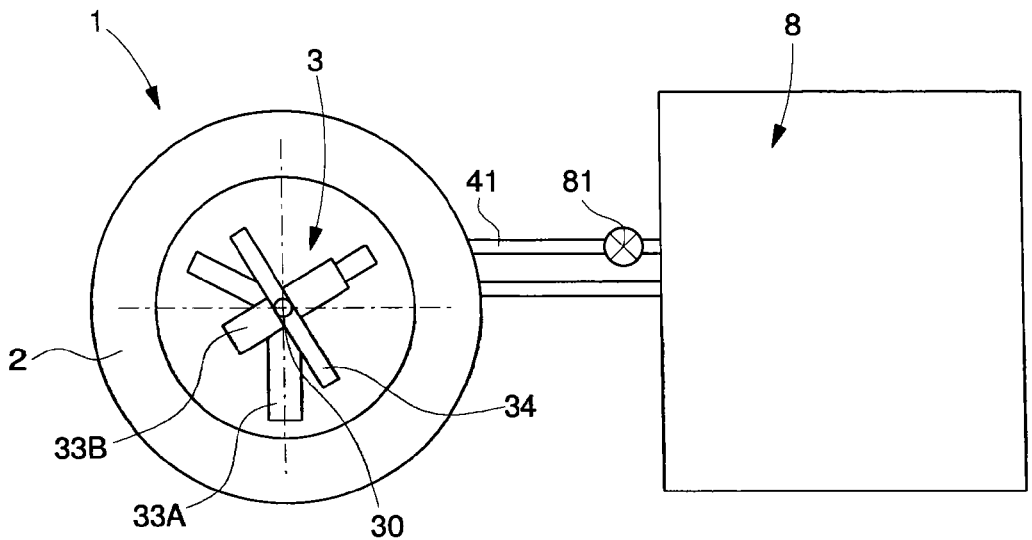
FIG. 6 shows a partial, schematic, top view (omitting the connections with the control system) of a mixer according to the first variant of FIG. 2.
Figure 7:
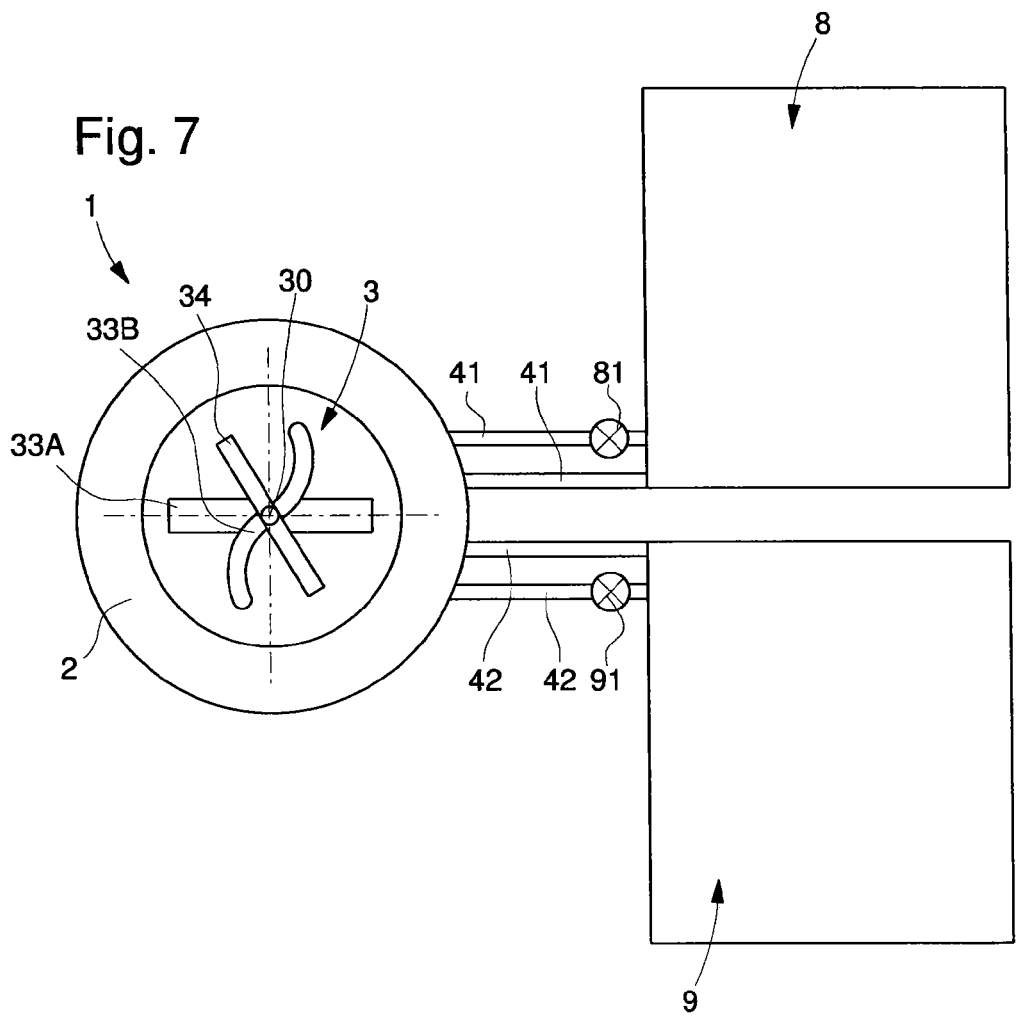
FIG. 7 shows, in a similar manner to FIG. 6, a mixer according to the second variant of FIG. 3.

In the variant shown in FIGS. 2 and 6, heat exchange means 4 include a single heating circuit, which includes a heating means 41 and which is connected to a first heat exchange and mixing temperature maintenance circuit 8. Heating means 41 include, for example, at least one thermoregulator of a type such as "HB Therm" or similar, using oil, temperature controlled, under a maximum pressure of 5 bars, allowing for a positive temperature gradient, or a negative temperature gradient. This thermoregulator can then be used to control the reduction in temperature of tank 2.

According to a specific implementation of the invention, when the high temperature stabilisation of tank 2 and its content, is stopped at a temperature which is above or equal to a specific temperature for the mixture concerned and characteristic of a compact homogeneous mass, the temperature of tank 2 and its content is reduced either by natural means or by connecting the heat exchange means to a second ambient temperature circuit at around 20° C.

In particular, when mixer 1 is equipped with a second cooling circuit 9, heat exchange means 4 can be connected to this second circuit 9, which is at an ambient temperature of around 20° C., to reduce the temperature.

Tank 2 is preferably equipped with a sealed lid 39 to prevent any pollution of the mixture, and to ensure that the proportions of the different ingredients of the mixture are adhered to.

According to another specific implementation of the invention, during or after said reduction in temperature, said compact mass is crushed, either in tank 2 at a temperature below 100° C. and at a speed higher than or equal to 700 revolutions per minute of mixing means 3, or in a crushing plant attached to the mixer 1.

For the implementation of the latter embodiment including a higher speed of rotation, tank 2 is advantageously coated on the inside with an anti-wear coating, such as diamond or glass or similar.

A specific sequence for the use of mixer 1 is presented below, for an example of production batches with a mass of approximately 5 kg (i.e. a volume of approximately 10 liters) of zirconium oxide based ceramic, with the following steps, specifying notably what is meant by low speed, high speed, and high temperature:

step 100: loading, either directly into tank 2, or in a feeder 21, of a first part of the load of powder and structurants, notably including the powder and polymer plastics, launching of the tank temperature regulator at the maximum temperature T0 comprised between 125° C. and 180° C. and preferably close to 125° C., by activation of heating means 41 and deactivation of cooling means 42, starting the rotation of mixing shaft 30 at V0 comprised between 150 and 300 revolutions per minute.

step 110: after reaching temperature T1=145° C. to 150° C. and a speed of rotation of V1=300 revolutions per minute, loading of a second part comprising the remainder of the binder load, notably including the wax bases.

In a variant, step 110 is carried out at a speed V1 between 300 and 700 rpm. In another variant, in a step 115, after loading this second part of the load the rotational speed is restarted at approximately 700 rpm.

step 120: after reaching a temperature T2=160° C., the rotation of shaft 30 is stopped, tank 2 is opened for inspection and to scrape the walls and paddles/blades if necessary (this inspection phase may be assisted by a camera, however protection against pollution is difficult, the best check of crushing in tank 2 and of paddles 33 and 34 may be carried out by measuring the torque or the power absorbed by motor 31, with reference to the set point values for a reference production stored in storing means 7).

step 130: restarting of rotation, after reaching a temperature T3=168° C. and a speed of rotation V3=700 rpm, the rotation of shaft 30 is stopped, the tank is opened, inspection step 135, scraping of the walls and the paddles/blades according to step 136 if required.

step 140: restarting of rotation, after reaching a temperature TINF=T4=170° C. and a speed of rotation V4=700 rpm, mixing continues for a predefined duration D4.

step 150: measuring of the compact mass temperature, which must be comprised between T5 between 178° C. and 185° C., notably close to 180° C. and TSUP=T6=190° C. (test step 155), mixing continues until this temperature range is reached.

step 160: rotation of shaft 30 is stopped, cooling is achieved by deactivating heating means 41 and activating cooling means 42.

step 170: after reaching a temperature between T7=150° C. and T8=180° C. (test step 175), and preferably lower than or equal to 160° C., the compact mass is set into rotation to unblock the paddles/blades and/or improve the shearing, the thermal inertia should be checked as this may introduce an important differential, of as much as 20° C., between the temperature displayed on the sensor on the tank and the temperature of the mixed mass, which is higher. The time interval between phases 160 and 170 may be long compared with the full cycle time, notably around 10 minutes.

step 180: occasional rotations at V9 of between 300 and 700 rpm to form the "cake", preferably close to 700 rpm, and cooling to a temperature of between T9=95° C. and T10=110° C. This cooling is carried out either by switching the temperature regulation system to cooling mode in the first variant, with a negative gradient of around −2° C. per minute, or in a second variant, by deactivating heating means 41 and activating cooling means 42.

step 190: checking that there is no pollution, and total stopping of rotation in the event of pollution and then step 195: manual finishing of the cutting of the "cake".

In a variant with production batches of a mass of approximately 10 kg (i.e. a volume of approximately 20 liters) of zirconium oxide based ceramic, the parameters change, for an optimal output:

step 100: temperature T0 preferably close to 180° C. and speed V0 of around 150 to 189 rpm.

steps 110 and 115 with speed V1 less than 350 rpm, preferably less than 300 rpm.

step 130: speed V3 of around 300 rpm.

step 140: speed V4 of around 300 to 350 rpm.

step 180: speed V9 close to 300 rpm.

The following steps depend on the equipment of mixer 1 in terms of means for cutting the "cake", crushing, and means for protecting tank 2 against abrasion.

If no specific means are provided, the blocks cut from the cake are removed manually, and the crushing is carried out in an additional means.

With a tank 2 equipped with an internal coating to protect it from abrasion, the following steps may be performed directly in the mixing tank.

step 200: crushing at V11 above 700 rpm, notably above 1000 rpm. This speed is only limited by the equipment, and may notably reach 10000 rpm.

step 210: stopping the rotation of shaft 30.

step 220: evacuation at less than V12=2000 rpm and at less than T12=85° C., the higher speed of 100 rpm generally leads to the product being ground into a powder, such a product is then easy to rework, notably with screw extrusion or evacuation, to be made into pellets or similar, in particular by cutting the body formed by compressing said powder in a screw.

Advantageously, at the output of the extruder or a pellet cutter machine, pellets of different sizes are created, the different volumes are advantageous, further downstream, when they are used to feed an injection press, since they are easier to imbricate, in an injection press. This may lead to a major time saving, for example 18 seconds rather than 25 seconds for the ceramic mix for the middle part of a watch.

In this example of a 5 kg load, the total motor cycle time is between 20 and 30 minutes, the total cooling time is between 15 and 30 minutes, and the total evacuation time is between 5 and 15 minutes.

In a specific manner, this method is implemented for an injection moulding composition (feedstock) intended for the manufacture of metallic or ceramic shaped parts including 76 to 96% by weight of inorganic powder and 4 to 24% by weight of binder including:

between 35 and 54% by volume of a polymeric base,
between 40 and 55% by volume of a mixture of waxes,
and approximately 10% by volume of a surfactant,
in which the polymeric base contains copolymers of ethylene and methacrylic or acrylic acid, or copolymers of ethylene and vinyl acetate, or copolymers of ethylene including maleic anhydride or a mixture of these copolymers, as well as polyethylene, polypropylene and acrylic resin.

This type of sequence is particularly suited to a mixture of raw materials including 14% by mass of binder which itself includes 50% by volume of material forming a structural matrix, 42% of material forming a fluidising matrix, and 8% of material forming a surfactant matrix.

In a specific manner, the method is implemented using a binder according to the invention, of one of the types described above, including in particular:

between 35 and 54% by volume of a polymeric base,
between 40 and 55% by volume of a mixture of waxes,
and approximately 10% by volume of a surfactant,
in which the polymeric base contains copolymers of ethylene and methacrylic or acrylic acid, or copolymers of ethylene and vinyl acetate, or copolymers of ethylene including maleic anhydride or a mixture of these copolymers, as well as polyethylene, polypropylene and acrylic resin.

This working range, used with a mixer 1 as defined above, makes it possible to prevent a number of the problems encountered with the prior art:

all temperature gradients are controlled and precise.

the increase in temperature of the mixture and the compact mass is strictly limited to a predefined maximum threshold, here equal to TSUP=T6=190° C.

the cooling time is reduced as a result of the heat exchange means which allows the compact mass to be cooled.

the temperature of the compact mass can be maintained at a given value when the rotation of the shaft is stopped, as a result of a heat exchange means that allows for the heating or cooling of the compact mass, via the tank.

the tank temperature correctly approximates the temperature of the compact mass, which is still better determined with an immersed sensor, either by manual inspection or with a sensor operated by a robotic arm.

the powder in the mixture no longer sticks to the walls of the tank during heating, as a result of the low speed control of the paddle rotational speed during the cold premixing of the ingredients.

regulation makes it possible to limit wear on the tank walls and on the paddles/blades, and pollution is therefore greatly reduced, and the equipment is worn out far less quickly.

the process can be carried out with the tank closed, optical monitoring, particularly by camera, may determine any need to scrape the walls of the tank, which is in theory less clogged than in the prior art owing to a gradual increase in temperature, and the control of the rotational speed of the paste.

the mixing homogenisation of the compact mass is satisfactory, and consequently the feedstock pellets exhibit identical reproducible behaviour during injection moulding.

power consumption for driving, heating and cooling is reduced.

What is claimed is:

1. A method of mixing raw material for powder metallurgy, for manufacturing a given type of ceramic feedstock pellets from a specific mixture including at least one inorganic powder of at least one oxide or cermet or metal or nitride type element or of at least one compound including at least one of said elements and at least one binder, according to which method:

the mixture is added to a tank of a mixer including at least one mixing shaft and paddles and/or blades; the temperature of said tank and the content thereof is stabilized, by connecting a heat exchanger to a first heat exchange and mixing temperature maintenance circuit, close to a mixing temperature comprised between a lower temperature above which the specific mixture becomes a paste, and a higher temperature below which said specific mixture is maintained, and said heat exchanger, which includes a heater arranged to heat said tank or/and the content thereof, is controlled to a temperature comprised between said lower temperature (TINF) and said higher temperature (TSUP), said lower temperature (TINF) and said higher temperature (TSUP) being stored in a memory, for said specific mixture for a given type of ceramic, so that that said heater exchanges energy, in a first connection, with a first heat exchange and mixing temperature maintenance circuit, external to said tank, and wherein the thermal inertia of the first circuit is higher than that of said tank fully loaded with said specific mixture;

said mixing shaft is set in motion at a speed lower than or equal to 700 revolutions per minute (rpm);

said mixture is mixed until a compact homogeneous mass is obtained;

the high temperature stabilisation of said tank (2) and the content thereof for which a reduction in temperature has been authorised is stopped at a temperature equal to or above a temperature (T5) which is specific to the mixture concerned and a characteristic of the compact homogeneous mass.

2. The mixing method according to claim 1, wherein the thermal inertia of said first circuit is higher than that of said tank fully loaded with said mixture by a first factor (K1) higher than 2.

3. The mixing method according to claim 1, wherein, to limit or reduce the temperature of said specific mixture, or/and when the high temperature stabilization of said tank and the content thereof is stopped at a temperature above or equal to a temperature specific to the mixture concerned and the characteristic of the compact homogeneous mass, the temperature of said tank and the content thereof is reduced, and a negative temperature gradient controls said heat exchanger, which includes a cooler which exchanges energy, in a second connection, with a second circuit at ambient temperature close to 20° C., external to said tank, and separate from said first circuit, and wherein the thermal inertia of said second circuit is higher than that of said tank fully loaded with said mixture.

4. The mixing method according to claim 3, wherein the thermal inertia of said second circuit is higher than that of said tank fully loaded with said mixture by a second factor higher than 2.

5. The method according to claim 3, wherein specific cooling is carried out in the following:
a temperature regulator for the tank is started at a maximum temperature T0=180° C. by activating said heater and deactivating said cooler;
said compact mass is cooled by deactivating said heater and activating said cooler;
a "cake" is cooled to a temperature comprised between T9=95° C. and T10=110° C., said cooling being carried out either by switching a temperature regulation system to cooling mode, with a negative gradient of around −2° C. per minute, or by deactivating said heater and activating said cooler.

6. The mixing method according to claim 1, wherein, during or after said reduction in temperature, said compact mass is crushed, in said tank at a temperature below 100° C. and at a speed of said mixing shaft higher than or equal to 700 (rpm).

7. The method according to claim 1, wherein the method is applied to the production of volumes of several liters of a specific mixture of zirconium oxide based ceramic, with the following:
a first part of a load of powder and structurants, including powder and polymer plastics is poured directly into said tank or into a feeder upstream of said tank, a tank temperature regulator is started at a maximum temperature of T0=180° C. by activating said heater, the rotation of said mixing shaft of said tank is started at a speed V0=300 rpm;

once a temperature T1=145° C. for said tank and a speed of rotation of V1=300 rpm for said mixing shaft are attained, a second part forming the remainder of a binder load is added;
once a temperature T2=160° C. for said tank is attained, the rotation of said shaft is stopped;
the contents of said tank and said shaft is inspected and if necessary paddles or/and blades on said shaft are scraped;
said shaft is set in motion again;
once a temperature T3=168° C. for said tank and a speed of rotation V3=700 rpm for said mixing shaft are attained, the rotation of said shaft is stopped;
the contents of said tank and said shaft are inspected;
if necessary the paddles or/and the blades comprised in said shaft are scraped;
said shaft is rotated again, and once a temperature TINF=T4=170° C. for said tank and a speed of rotation V4=700 rpm for said mixing shaft are, attained, the mixture is mixed for a predefined duration D4 specific to the particular mixture;
the temperature of the compact mass obtained, which must be comprised between T5=180° C. and TSUP=T5=190° C., is measured and mixing continues until this temperature range is reached;
rotation of said shaft is stopped, said compact mass is cooled by deactivating said heater;
once a temperature comprised between T7=150° C. and T8=180° C. for said compact mass is attained, said compact mass is set in rotation to unblock the paddles/blades of said shaft and/or to improve shearing;
occasional rotations of said shaft are controlled at V9=300 rpm to form a "cake", and said "cake" is cooled to a temperature comprised between T9=95° C. and T10=110° C., said cooling being accomplished either by switching a temperature regulation system to cooling mode, with a negative gradient of around −2° C. per minute, or by deactivating said heater.

8. The method according to claim 7, wherein said mixer is used, equipped with a crusher inside said tank, and said tank, equipped with an internal anti-abrasion coating, and in that after the cooling of said "cake", the following is carried out directly in said tank:
crushing at V11=700 rpm for said mixing shaft;
the rotation of said shaft is stopped;
the product obtained is evacuated at less than V12=2000 rpm for said mixing shaft at less than T12=85° C. for said tank.

9. The method according to claim 8, wherein said crushing is carried out a speed higher than 100 rpm for said mixing shaft to obtain flour from the product in powder form, to achieve evacuation by a screw extrusion by screw and the formation of pellets.

10. The method according to claim 1, wherein the method is implemented by using a binder including:
between 35 and 54% by volume of a polymeric base, between 40 and 55% by volume of a mixture of waxes, and approximately 10% by volume of a surfactant, in which the polymeric base contains copolymers of ethylene and methacrylic or acrylic acid, or copolymers of ethylene and vinyl acetate, or copolymers of ethylene including maleic anhydride or a mixture of these copolymers, as well as polyethylene, polypropylene and acrylic resin.

11. The method according to claim 10, wherein the method is implemented using an injection moulding composition intended for the manufacture of shaped metallic or ceramic parts including 76 to 96% by weight of an inorganic powder and 4 to 24% by weight of said binder, and wherein said inorganic powder and the moulding composition are chosen from a group including an oxide, nitride, carbide or metal powder or a mixture of said powders.

12. The method according to claim 11, wherein said inorganic powder is chosen from the set including alumina powder, zirconium oxide powder, chromium carbide powder, titanium carbide powder or tungsten carbide powder, a tungsten metal powder or silicon nitride powder, a stainless steel powder, a titanium metal powder or a mixture of said powders.

13. The method according to claim 11, wherein said moulding composition is chosen to contain in by weight:

76 to 88% of alumina and 12 to 24% of binder, or 76 to 88% of alumina and 0.1 to 0.6% of magnesium oxide and 12 to 24% of the binder, or 58 to 86.5% of zirconium oxide and 3.9 to 4.6% of yttrium oxide and 0.18 to 18.5% of alumina and 9 to 22% of the binder, or 61.5 to 84% of zirconium oxide and 3.9 to 4.6% of yttrium oxide and 0.2 to 9% of alumina and 2 to 5.5% of inorganic pigments from a list including iron oxide, cobalt oxide, chromium oxide, titanium oxide, manganese oxide, zinc oxide or a mixture of said oxides and 9 to 22% of the binder, or 88 to 91% of chromium or titanium carbide, and 9 to 12% of the binder, or 93 to 96% of tungsten carbide or tungsten metal and 4 to 7% of the binder, or 78 to 85% of silicon nitride, and 15 to 22% of the binder.

14. The method according to claim 1, wherein the method is applied to a mixture of raw materials including 14% by mass of binder which in turn includes 50% by volume of material forming a structural matrix, 42% of material forming a fluidising matrix, and 8% of material forming a surfactant matrix.

* * * * *